3,202,418
SAW GUIDE AND GAUGE TOOL
Eddie A. Dare, 220 S. Alfred Ave., Elgin, Ill.
Filed Oct. 30, 1963, Ser. No. 320,016
7 Claims. (Cl. 269—290)

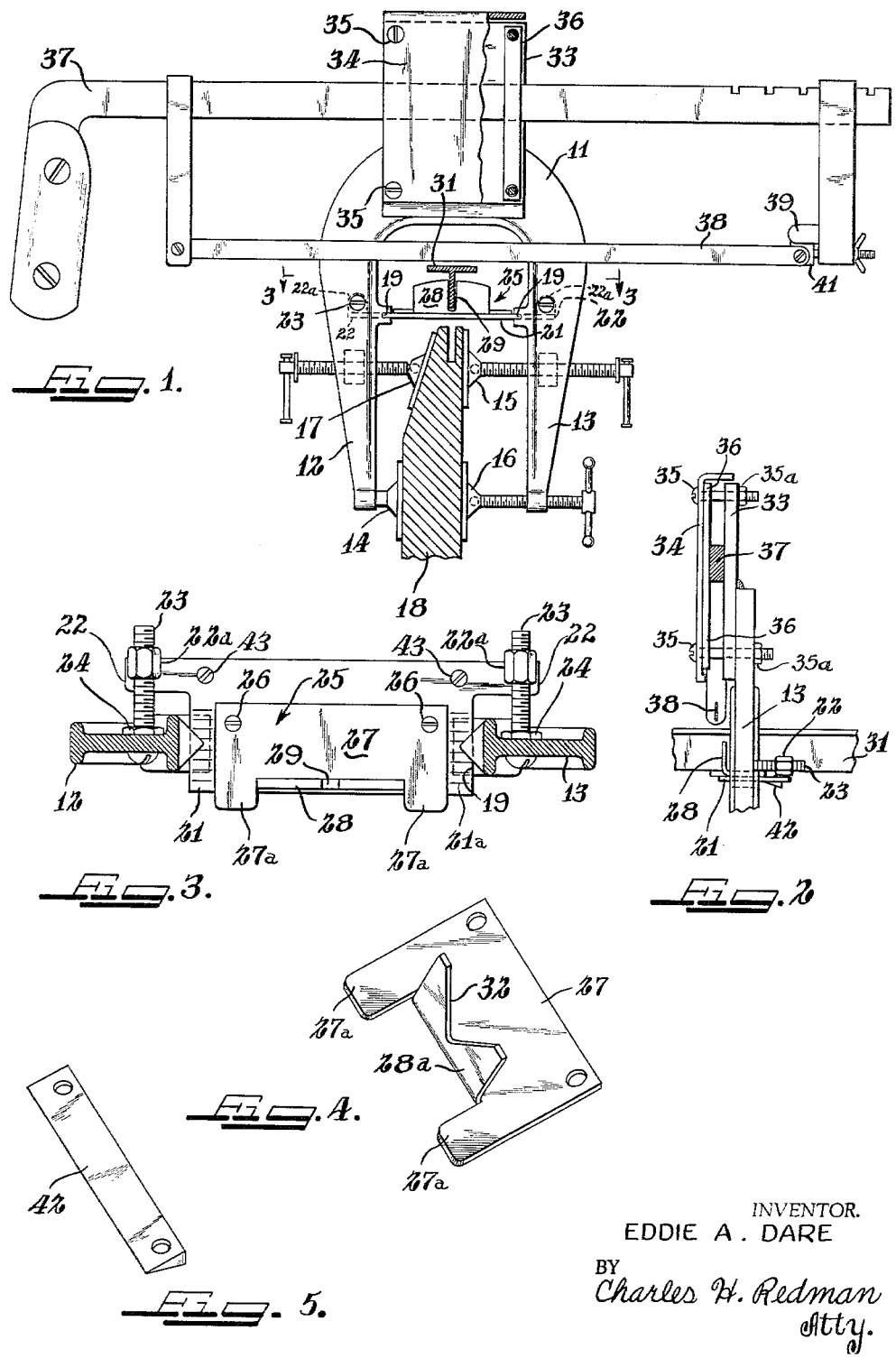

The present invention relates to improvements in hack saw holding and guiding fixtures and is particularly concerned with the novel construction and assembly of a fixture embodying novel mounting means and novel means for guiding the saw blade relative to an adjustable work holding member.

More particularly, the invention utilizes a C-clamp modified to render it suitable for attachment to an inclined or uneven support surface and embodying novel means for guiding a saw blade across a work piece supported in the clamp. Further, the hack saw frame used in combination with the novel clamp has novel means therein to prevent rocking or twisting of the saw blade.

It is, therefore, an object of the invention to provide a hack saw guide of novel construction.

Another object is to provide a C-clamp of novel construction.

Antoher object is to provide a hack saw frame with novel means to prevent twisting of the saw blade therein.

Another object is to provide a hack saw guiding fixture with a work piece holder of novel construction and mounting.

The structure by means of which the above noted and other advantages and objects of the invention are attained will be described in the following specification, taken in conjunction with the accompanying drawings, showing a preferred illustrative embodiment of the invention, in which:

FIG. 1 is a front elevational view of the modified C-clamp, showing a hack saw and work piece positioned therein;

FIG. 2 is a side elevational view of the assembly, showing the hack saw in section;

FIG. 3 is a horizontal sectional view illustrating the work piece holder, taken on line 3—3 of FIG. 1;

FIG. 4 is a perspective view of an alternate form of work holder; and

FIG. 5 is a perspective view of a wedge plate.

Referring to the exemplary disclosure illustrated in the accompanying drawings, the assembly includes a C-clamp comprised essentially of a bight portion 11 and depending legs 12, 13. The leg 12 has a fixed mounting pad 14 at its lower end and an adjustable pad 17 spaced upwardly therefrom. The other leg 13 has a pair of vertically spaced pads 16, 15 adjustable in conjunction with adjustment of pad 17 for embracing a support, such as rail 18, irrespective of its surface configuration so as to secure the C-clamp centrally thereover in the upright position illustrated.

The opposed inner faces of legs 12, 13 each have a rearwardly extending horizontal guide slot 19, horizontally aligned one with the other, in which the marginal edges of a support plate 21 are slideable. The support plate is of greater width than the thickness of legs 12, 13 and it carries on one edge a pair of laterally offset ears 22 each having secured thereto a nut 22a through which nuts, bolts 23, mounted in the legs, extend. A nut 24 is threaded on each bolt 23 to lock it in position against free rotation. As is well understood, the plate 21 may be adjusted in a forwardly or rearwardly direction by manipulation of bolts 23. The position of plate adjustment can be observed by reference to scale markings 21a on the plate 21.

Mounted firmly on the support plate is a work piece guide member 25 which is secured to said plate as by means of screws 26. In the FIGS. 1–3 illustration, the guide member includes a base wall 27 having forwardly extending arms 27a, which limit the downward movement of the hack saw blade, and an upstanding flange 28 having a vertical slot 29 therein for receiving one leg of a T-shaped work piece 31 that is to be sawed. In the FIG. 4 illustration, the flange 28a has a V-slot 32 to receive another form of work piece therein. Obviously, other slot shapes suggest themselves.

As perhaps best shown in FIGS. 1 and 2, a plate 33 is secured firmly to the C-clamp bight portion 11, as by welding, and it extends upwardly therefrom in the plane thereof. A front plate 34 overlies and is detachably secured to said plate 33, as by means of bolts 35, which also hold in place friction strips 36. Adjustment of bolts 35, with the associated lock nuts 35a, increases or decreases the friction upon a hack saw frame 37 mounted between plate 33 and strips 36. This assembly affords a guide mounting for the hack saw frame 37 which mounts a saw blade 38. Referring to FIG. 1, the hack saw frame 37 includes a lug 39 that lies close to the saw blade attaching post 41 so as to prevent twisting or turning of the saw blade while it is in use.

Mounted on the underside of support plate 21 is a wedge shaped bar 42, secured by screws 43, useful when cutting an oval or circular work.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim and desire to secure by Letters Patent of the United States is:

1. A hack saw guide comprising an inverted C-clamp having spaced depending legs, a plurality of adjustable pads on said C-clamp, an upstanding wall on the upper end of said C-clamp, a guide plate secured to and spaced from one face of said wall adapted to receive and guide a hack saw frame between the wall and plate, a support plate bridging said legs, a work piece guide member secured to said support plate, and means to adjust the support plate and guide member.

2. The hack saw guide recited in claim 1, in which the work piece guide member comprises a base wall and an upstanding flange.

3. The hack saw guide recited in claim 2, in which the upstanding flange is formed to receive and support a work piece therein.

4. The hack saw guide recited in claim 1, in which the support plate is slideable in guideways on the legs.

5. The hack saw guide recited in claim 1, in which the means to adjust the support plate comprises an adjustable threaded member on each leg and threaded ears on the support plate through which the threaded members extend.

6. A hack saw guide comprising an inverted C-clamp having a bight portion and spaced legs depending from said bight portion, adjustable means carried by said legs to secure the C-clamp to a support, a wall integral with the bight portion and extending upwardly therefrom, said wall lying in the plane of the C-clamp, a guide member secured to and spaced from one face of the plate, said guide member and wall defining a friction guideway for a hack saw frame, horizontally aligned guideways in the opposed faces of said legs below the bight portion, a support plate slideable in said aligned guideways, a work piece holder mounted on said support plate, and means to adjust the support plate and work piece holder in unison along said aligned guideways.

7. The hack saw guide recited in claim 6 in which the guideways and support plate have complemental gauge means thereon.

References Cited by the Examiner

UNITED STATES PATENTS

| | | | |
|---|---|---|---|
| 1,051,356 | 1/13 | Thomas | 269—290 |
| 1,841,627 | 1/32 | Newbaver | 145—33 |
| 2,337,957 | 12/43 | Akins | 269—290 |
| 2,375,651 | 5/45 | Henry | 145—33 |

ROBERT C. RIORDON, *Primary Examiner.*

ANDREW R. JUHASZ, *Examiner.*